June 20, 1939.  E. W. HOBBS  2,163,092
CINEMATOGRAPH APPARATUS
Filed Oct. 15, 1937   9 Sheets—Sheet 1

INVENTOR
E. W. Hobbs
By Watson, Coit, Morse & Gurdler
ATTYS.

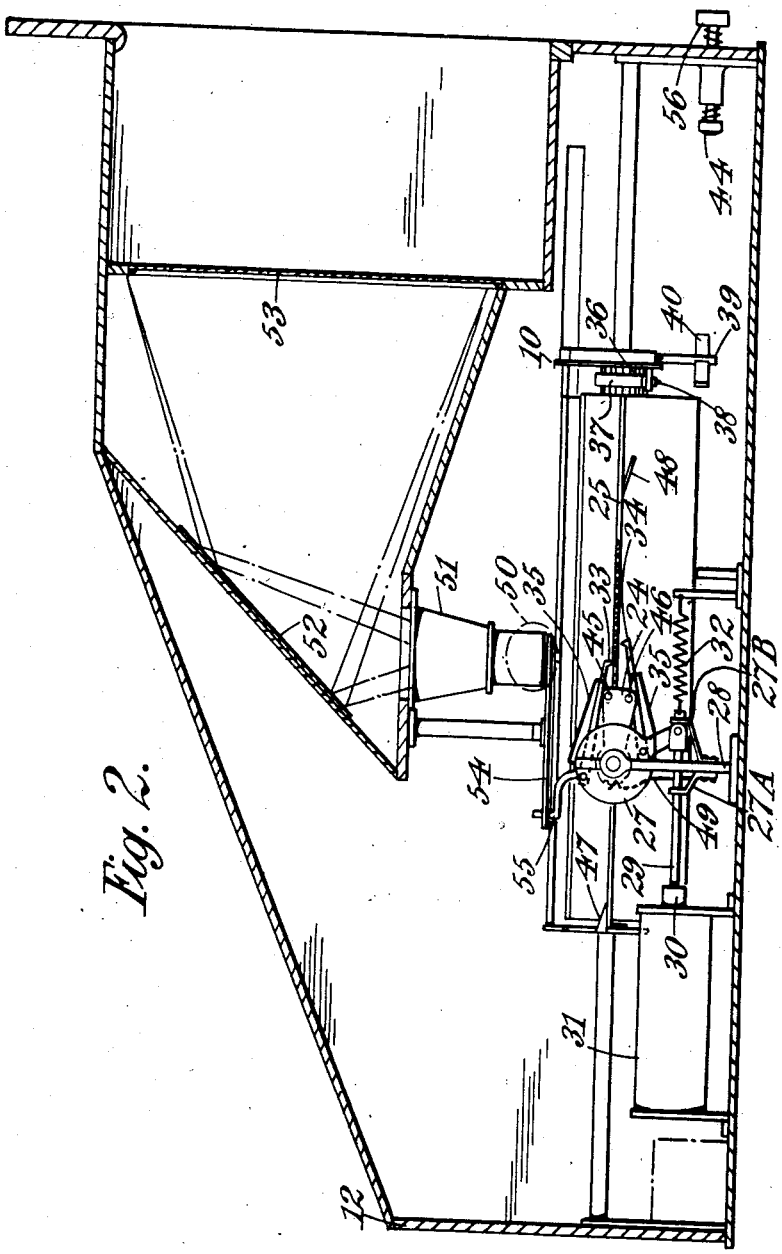

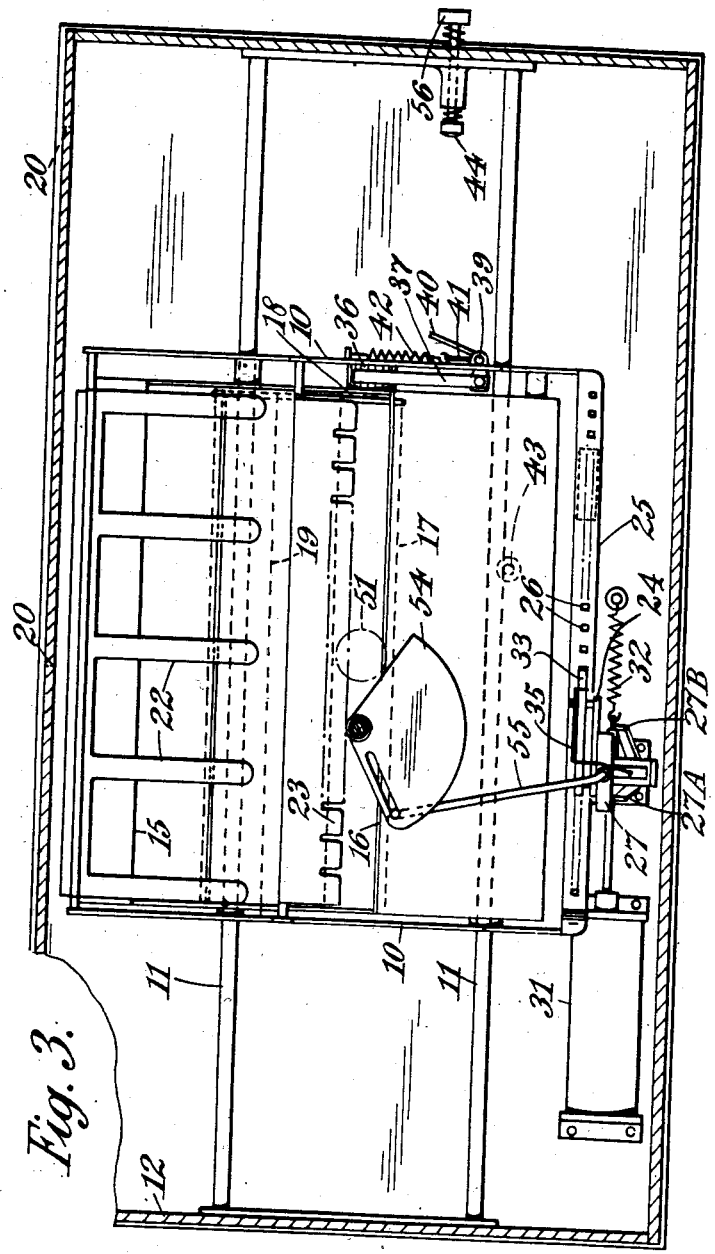

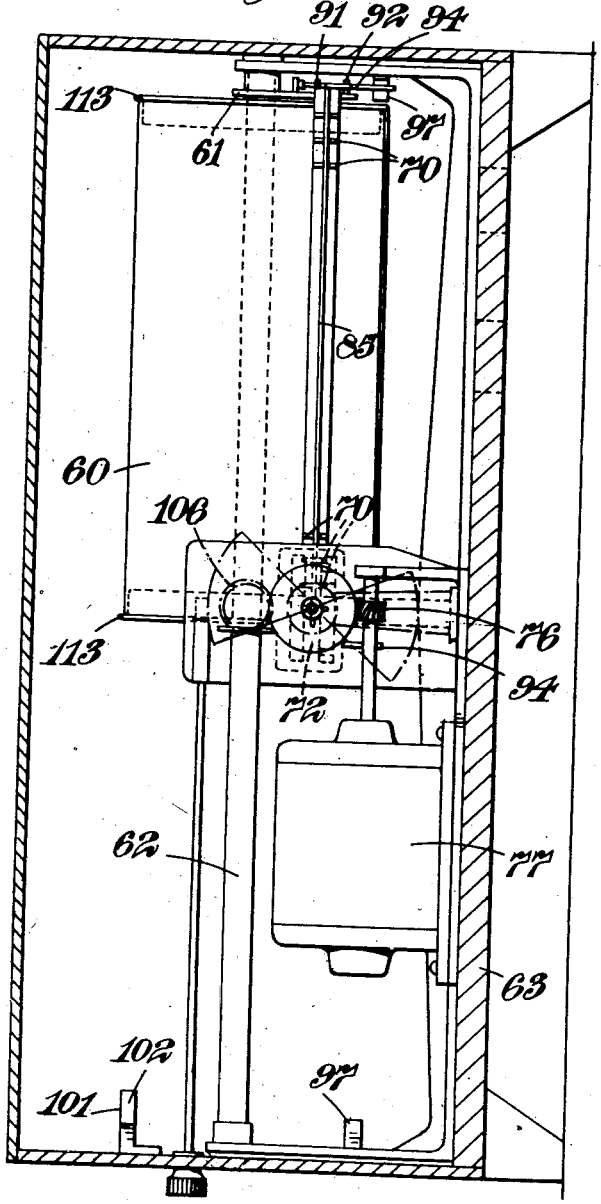

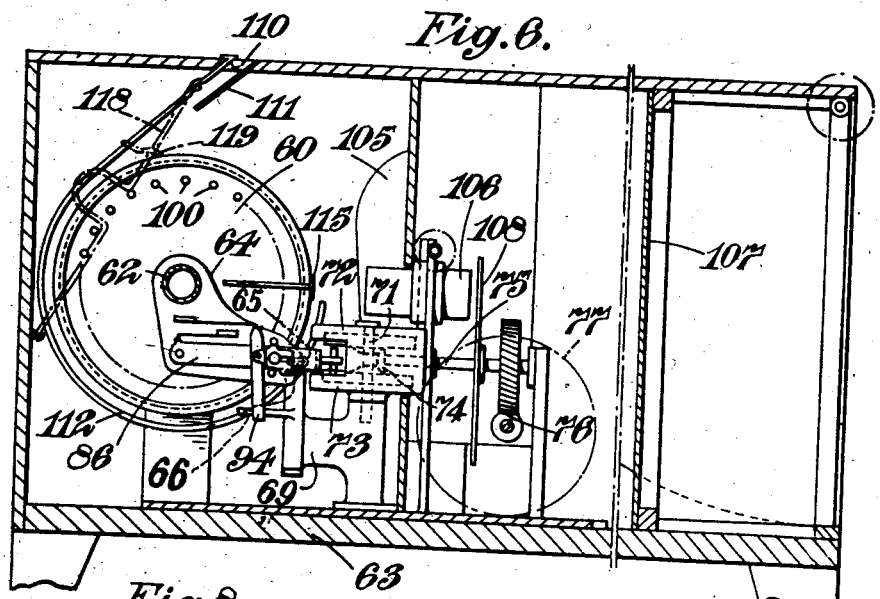
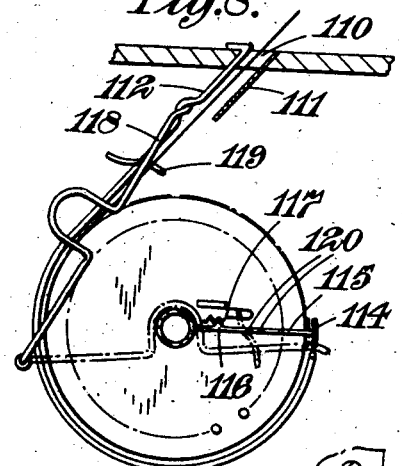
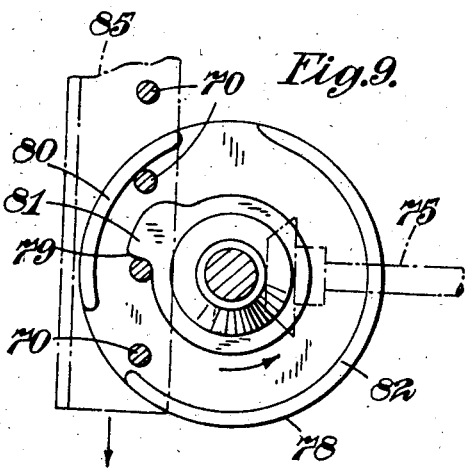
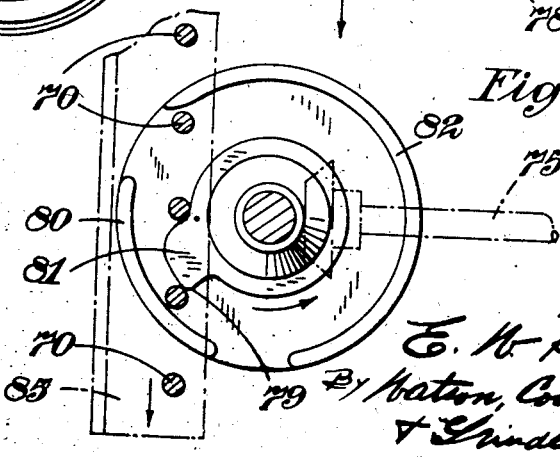

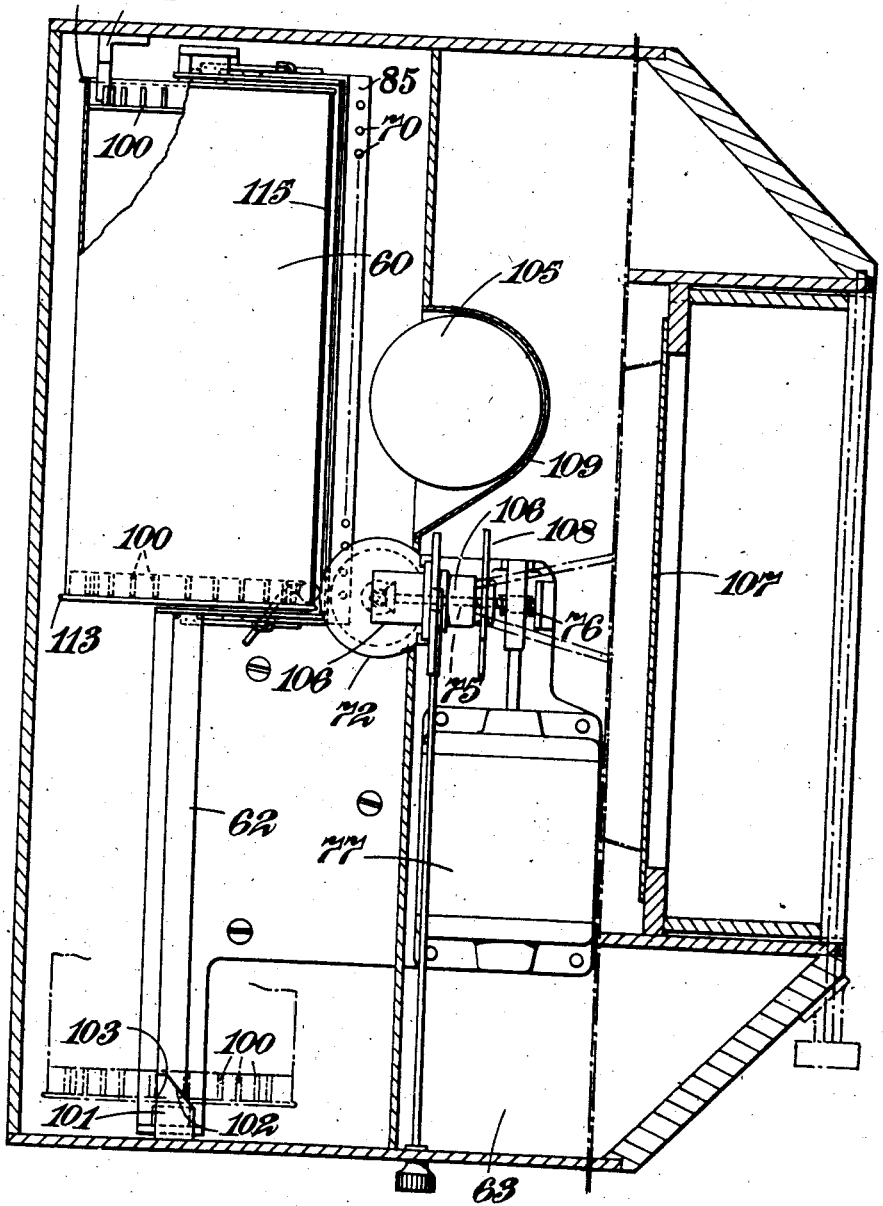

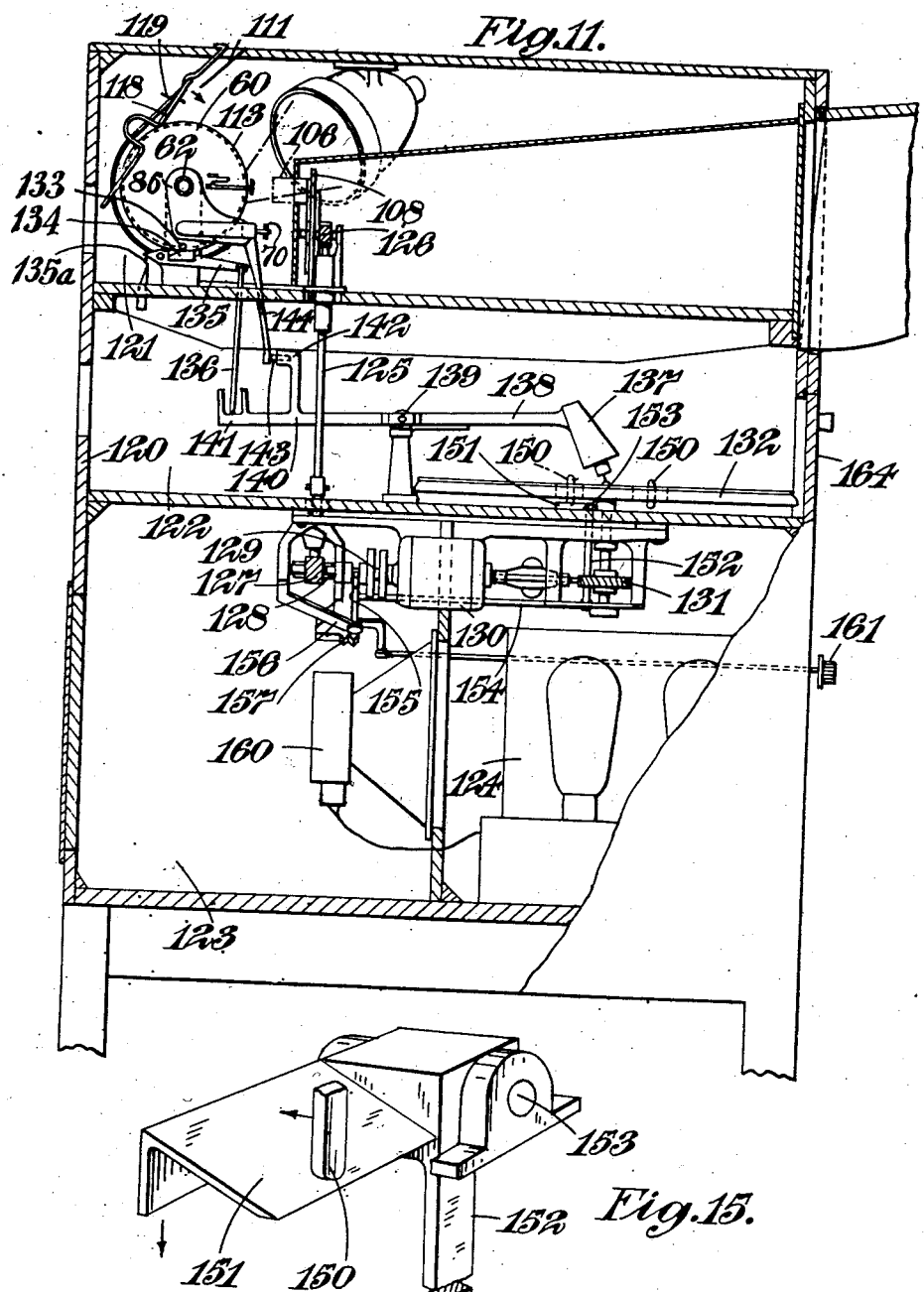

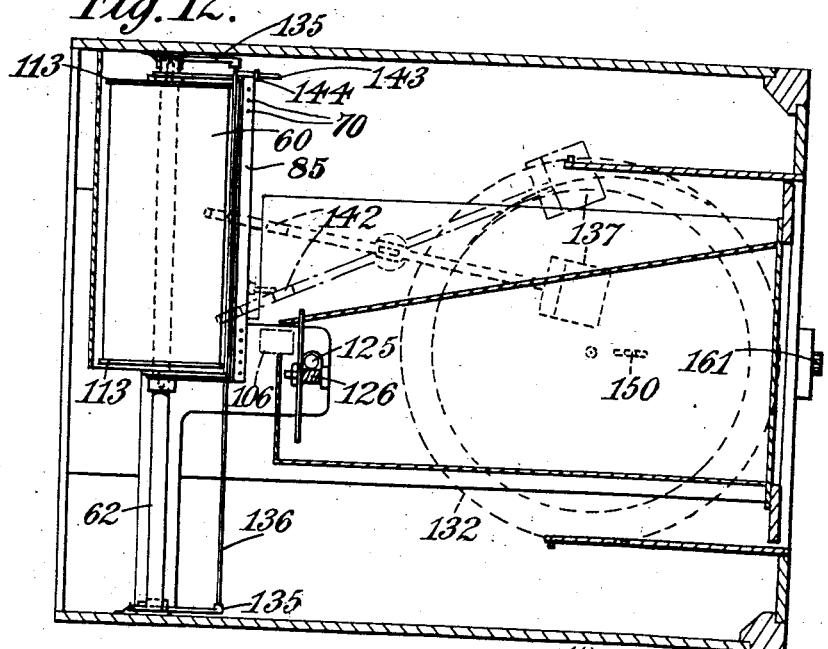
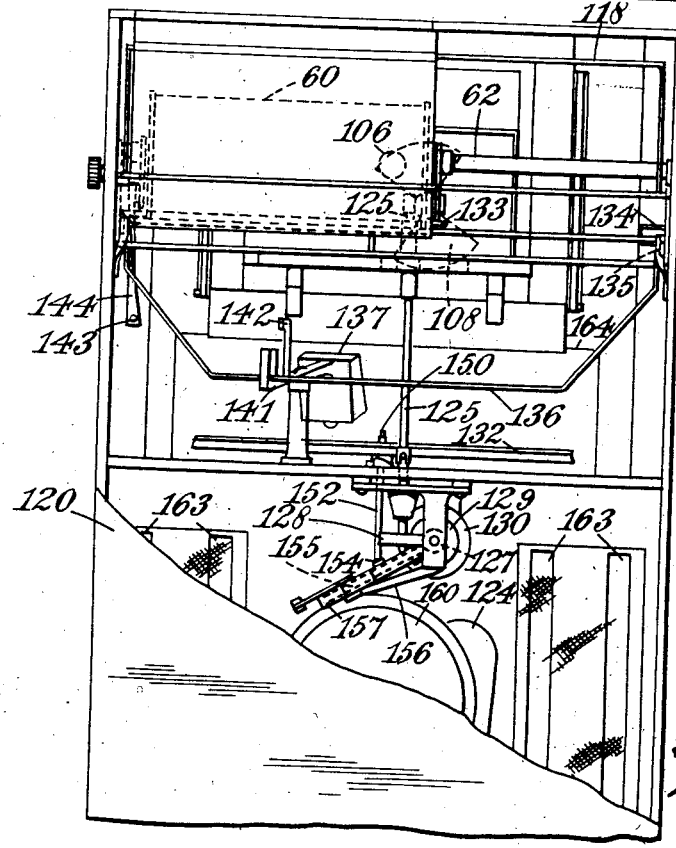

June 20, 1939.  E. W. HOBBS  2,163,092
CINEMATOGRAPH APPARATUS
Filed Oct. 15, 1937  9 Sheets-Sheet 9

INVENTOR
E. W. Hobbs,
By Watson, Coit, Morse &
Grindle ATTYS.

Patented June 20, 1939

2,163,092

UNITED STATES PATENT OFFICE 2,163,092

CINEMATOGRAPH APPARATUS

Edward Walter Hobbs, Pinner, England

Application October 15, 1937, Serial No. 169,269
In Great Britain January 27, 1937

2 Claims. (Cl. 88—16.2)

This invention relates to cinematograph apparatus and the object of the invention is to provide an animated display from a picture or like series of a simple and inexpensive character.

The invention uses in a cinematograph apparatus, a picture sequence comprising a sheet of paper or the like, which is not necessarily transparent, on which there is provided by printing or like process a picture series consisting of rows extending across the sheet and so arranged that the terminal picture of one row is adjacent the next following picture in series continued in the next row. Such picture sequence is simple and inexpensive to manufacture.

The invention comprises an apparatus for effecting a cinematograph display of the picture sequence aforesaid comprising a sliding carriage for the sheet, means for projecting light reflected from the pictures on to a screen, means for moving the carriage step-by-step to bring the individual pictures in each row successively into register with the projection means, means for reversing the step-by-step movement at the end of each travel of the carriage and means for advancing the picture sheet transversely in order to bring the rows of pictures successively into register with the projection means. The sequence of the individual pictures on the sheet is thus scanned in one direction across the sheet for the first row, then in the opposite direction across the sheet for the second row, and so on for the complete picture sequence.

According to a feature of the invention the picture sheet is mounted on a carrier which is movable on the sliding carriage and the picture carrier is advanced transversely by means operated by the movement of the carriage at each end of its travel. Thus, it is only necessary to apply a drive to the means for imparting step-by-step motion to the carriage for effecting the complete scanning operation. Preferably, the projection means comprises a shutter operatively connected to the means producing the movement of the carriage to mask the projected light during the movement of the carriage.

In one form of the apparatus the means for imparting step-by-step motion to the carriage comprises a series of abutments spaced lengthwise of the carriage according to the separation of the individual pictures in each row, a rocking or oscillating driving member, driving fingers carried on the rocking member for engagement with the abutments to drive the carriage in opposite directions and means automatically to disengage one driving finger and engage the other driving finger at each end of the travel of the carriage. In one construction the means for advancing the sheet carrier at each end of the travel of the carriage comprises a ratchet device on the sheet carrier having a pivoted operating lever arranged to engage normally stationary abutments at opposite ends of the travel of the carriage. Means is conveniently provided for manually reciprocating one of said abutments to advance the sheet carrier while the carriage is stationary, in order to feed a sheet onto and off the carrier.

In one form of the sheet carrier it comprises a roller and a resilient member engaging the roller and constituting a locating stop for the sheet applied to the roller. The picture sheet is inserted over the roller up to the resilient member which thus determines the proper position of the sheet with respect to the projection means and then the sheet is further fed on to the carrier by the ratchet device aforesaid which thus maintains proper relationship between the rows of pictures and the projection means.

According to another construction of the means for imparting step-by-step motion to the carriage there is provided a series of abutments spaced along the carriage according to the separation of the individual pictures, a rotatable driving member having a toothed part engaging between successive pairs of said abutments and having an effective width approximately equal to the space between adjacent abutments, and an annular retarding flange in the path of said abutments to engage behind an abutment immediately following the toothed part, and also to engage in front of an abutment in advance of the toothed part, which flange is formed with peripheral openings to permit the passage of said abutments to and from the toothed part. By continuous rotation of this driving member, a step-by-step motion of the carriage is obtained, and the provision of a toothed part which fully occupies the space between adjacent abutments and also the provision of the retarding flange serve adequately to control each step of the movement of the carriage. In one preferred construction there are employed two rotary driving members as aforesaid co-operating with the abutments to move the carriage step-by-step in opposite directions and means is provided automatically changing the engagement of the abutments with the respective driving members at each end of the travel of the carriage. In a convenient construction the abutments are carried on a frame adjustably mounted on the carriage, which frame is automatically controlled by means of a fixed stop at each end of the travel of the carriage to bring the abutments into engagement with the rotary members alternately.

In another form of the sheet carrier there is provided a rotatable drum for carrying the sheet on its periphery, which drum has a plurality of circularly arranged projections extending from each end and adapted to engage with fixed cams at the limits of travel of the carriage in order to advance the drum through a distance corresponding to the distance between adjacent rows of pictures at each end of the travel of the carriage. Each of these cams is conveniently of wedge-shape to enter between successive projections on the drum for accurately locating the drum in correct position after its adjustment at each end of the travel of the carriage.

Associated with the drum hereinbefore referred to for carrying the picture sheet there may be provided a manually movable member for wrapping the sheet around the drum and clamping means for holding the ends of the sheet on the drum, and operated to engage and disengage the sheet by said manually movable member.

It is a further feature of the invention to provide an apparatus for effecting a cinematograph display as aforesaid in combination with means for reproduction from a sound record, wherein a pick-up device for the sound record is operatively connected to a member controlled by the movement of the sliding carriage to bring the pick-up into starting position by movement of the carriage to one end of its range of movement. Conveniently, driving means for the sound record carrier is also coupled through a clutch to the drive for the carriage and means is provided on the sound record carrier for engaging the clutch at a predetermined position of the sound record carrier relatively to the pick-up device, in order to obtain synchronism between the picture display and sound reproduction.

In the accompanying drawings several specific embodiments of the invention are illustrated by way of example. In these drawings:—

Figure 5 is an end elevation, Figure 6 a side elevation and Figure 7 a plan of another form of the apparatus, the casing being shown in section;

Figures 8, 9 and 10 are detail views of the constructions shown in Figures 5, 6 and 7;

Figure 11 is a side elevation, Figure 12 a plan and Figure 13 is an end elevation of a cinematograph apparatus in combination with sound reproducing means, the outer casing being shown in section;

Figures 15 and 16 are detail views on an enlarged scale of control means for sound reproduction, and Figure 17 is a detail view on an enlarged scale of the construction shown in Figures 5, 6 and 7.

Like references indicate like parts in the several figures of the drawings.

Figure 1:
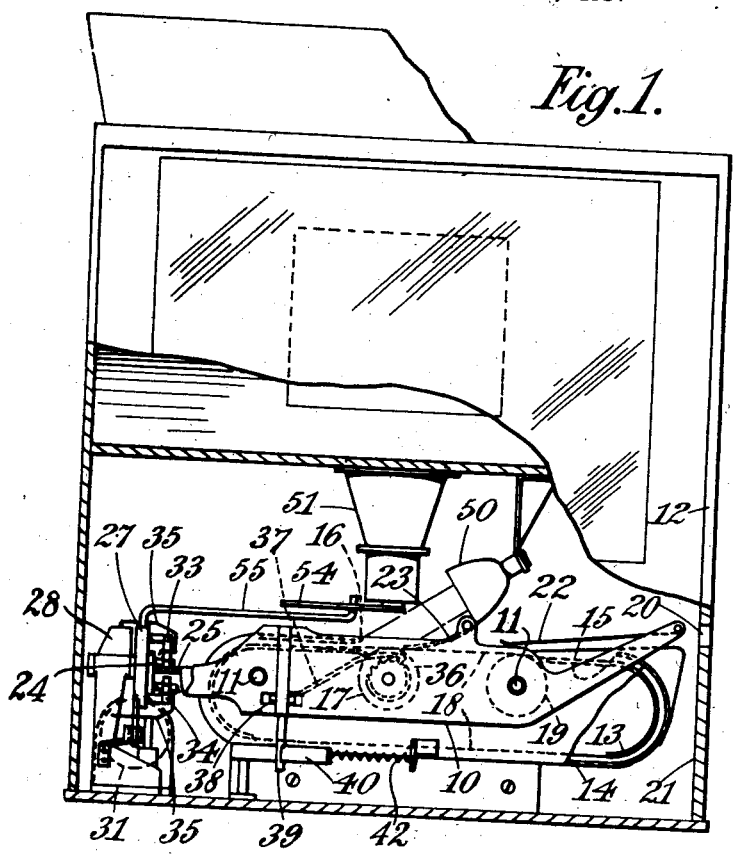
Figure 1 is an end elevation, Figure 2 a side elevation and Figure 3 a plan of one form of the cinematograph apparatus, these views being partly in section.

The construction shown in Figures 1 to 3 is especially applicable to the projection of pictures for advertising or like purposes and may be arranged to display the individual picture successively for appreciable intervals, although it may be operated at a quicker rate for a motion picture display.

In this apparatus there is provided a carriage indicated at 10 slidably mounted on bars 11 rigidly carried in a framework 12 attached to a casing 21 for the apparatus. On the carriage 10 there are mounted inner and outer guides 13 and 14 respectively between which the picture sheet is fed. The outer guide 14 is formed with an opening at the top extending the full width of the picture sheet to permit the sheet to be fed between the guides and also to permit projection of the pictures on the sheet. One margin of this opening is indicated at 15 and the other at 16 in Figures 1 and 3.

The carrier for the picture sheet comprises a roller 17 rotatably mounted in the end frames of the carriage and an endless belt 18 passing over this roller and an auxiliary roller 19. A gap is provided in the upper part of the guide 13 and the rollers 17 and 19 are so arranged that they project slightly above the guide. Alternatively, two gaps may be provided in the upper part of the guide 13, one for each of the rollers 17 and 19 so as to provide a portion of the guide between these rollers. The picture sheet is inserted through a slot 20 in a casing 21 housing the apparatus and beneath guide fingers 22 mounted on the end frames of the carriage 10. A resilient member 23 serves to locate and hold the paper sheet in close contact with the roller 17 as hereinafter described.

The carriage 10 is provided with a longitudinal feed bar 25 which is formed with perforations 26 to provide uniform spaced abutments for use in effecting a step-by-step movement of the carriage. A rocking member 27 mounted in a bearing 28 is linked to a rod 29 joined to the armature 30 of a solenoid 31 and a rocking motion of the member 27 is effected by periodically energising the solenoid 31 to move the armature 30 against the action of a return spring 32. At diametrically opposite sides of the rocking member 27 there are pivoted driving fingers 33 and 34 respectively, the former being above and the latter below the perforated bar 25, and formed at their ends to engage in the perforations in the bar. Each of these fingers 33 and 34 is provided with a spring 35 attached to the supporting frame of bearing 28 and tending to press the finger into engagement with the bar 25.

It will be appreciated that when the solenoid 31 is energised, the rocking member 27 moves and propels both fingers 33—34 simultaneously but in opposite directions. The fingers 33—34 are so shaped at their outer extremities that a thrust to the right is imparted to the feed bar 25 by the upper finger 33, whereas the shape of the extremity of the lower finger 34 is such that it imparts a pull on the feed bar 25 towards the left. The function of the return spring 32 is to restore the rocker and solenoid, solenoid armature 30, linkage 29 and rocker 27 and associated parts to their original starting position.

The precise amount of movement of the rocker 27 is limited in each direction by adjustable stops 27A, 27B attached to the supporting frame of the bearing 28.

An arm 24 pivoted on the axis of the rocker 27 has two pins 45 and 46 arranged to engage the driving fingers 33 and 34 respectively. The arm 24 is arranged to occupy either of two positions under the control of a spring 49 formed with a V-shaped part which can engage either of two corresponding recesses formed in the end of the arm 24. In one position of the arm 24 the pin 45 lifts the driving finger 33 out of contact with the perforated bar 25 and permits the finger 34 to engage the bar; and in the other position the pin 46 lifts the finger 34 clear and the pin 45 lowers the finger 33 on to the bar 25. The pins 45 and 46 also engage cams 47 and 48 respectively at opposite ends of the carriage. These cams serve to reverse the position of the arm 24 at each end of the travel of the carriage in order to determine the direction of movement of the carriage in accordance with the picture sequence.

On the roller 17 there is provided a ratchet wheel 36 and a pawl 37 engaging this ratchet wheel is pivoted on an arm 38 carried by a pivot pin 39 mounted on the carriage 10. Also, connected to this pivot pin 39 is a double-armed operating lever 40 and an extension 41 connected to a return spring 42. Cooperating respectively with the two arms of the lever 40 are two normally stationary abutments 43 and 44 mounted in the casing 21 at positions of the lever 40 corresponding respectively with opposite ends of the travel of the carriage 10.

Above the roller 17 there is provided a lamp 50 directing light upon the picture sheet at a position above the roller 17 and an optical projection system 51 is arranged to project light reflected from the picture sheet on to a mirror 52 and from thence on to a ground glass or similar viewing screen 53. A pivoted shutter 54 is provided operated by means of an arm 55 carried on the rocking member 27 and arranged to interrupt the projection during the time the carriage is actually being moved. It is therefore convenient to connect the fingers 33 and 34 to the rocking member 27 with some lost motion so that the shutter is operated slightly before the carriage is actually moved by the fingers 33 and 34. Alternatively, it may be convenient to increase by about 25% the amount of movement of the driving fingers 33 and 34 disposing them so that the initial movement traverses a solid part of the feed bar 25, the finger then engaging a perforation 26 and moving forward both itself and the bar for the requisite distance.

Figure 4:
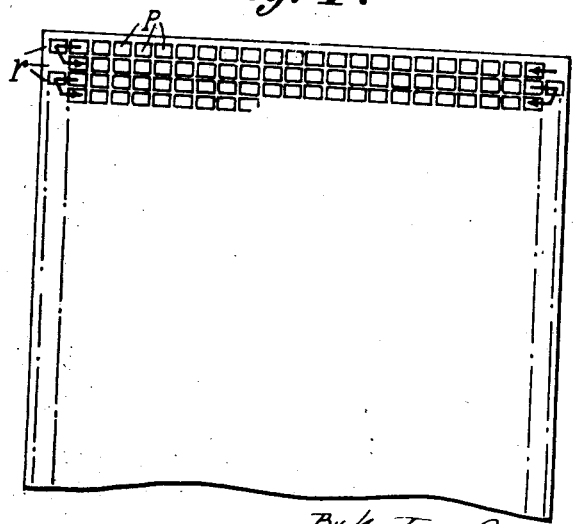
Figure 4 is a diagrammatic representation of a picture sheet.
Figure 14:
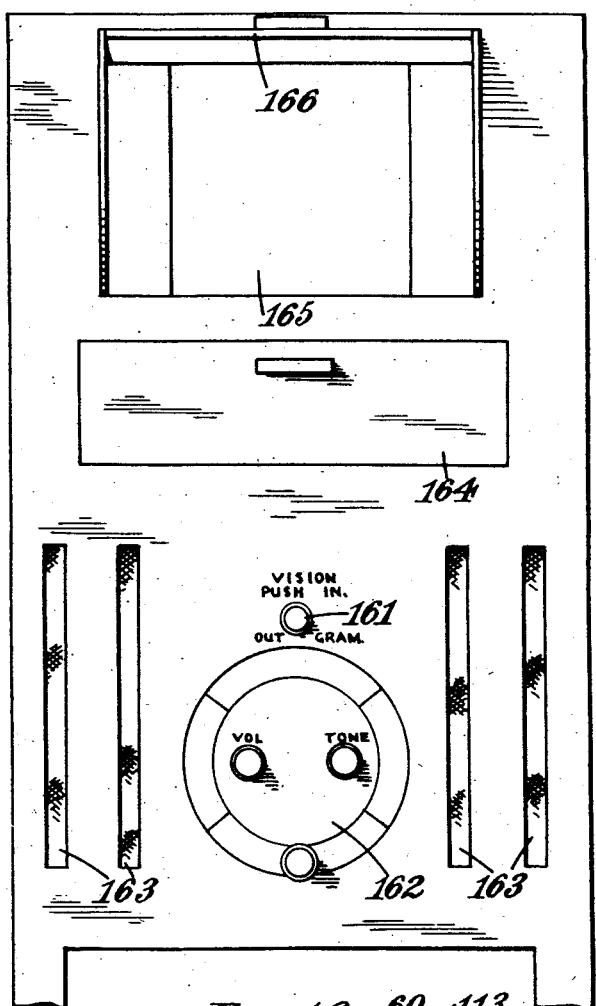
Figure 14 is a front elevation of the complete apparatus.
Figures 16, 17:
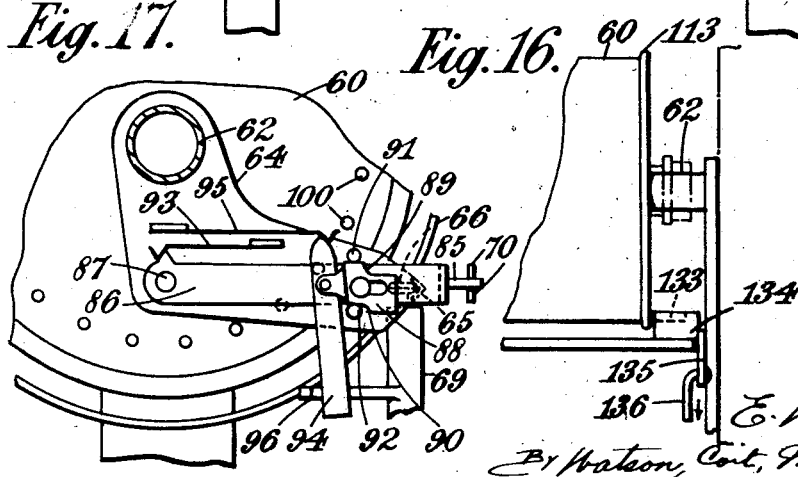

In use of the apparatus, there is employed a sheet carrying the picture sequence as diagrammatically represented in Figure 4 and having the individual pictures p arranged in rows r to be scanned in the order represented by the arrows in this figure. The carriage 10 is moved to the extreme position of its travel by energising the solenoid 31 periodically, which is to the right in Figure 3, and the sheet is inserted through the slot 20 in the casing beneath the fingers 22 to a position at which it is stopped by the pressure member 23. This member is so arranged that for a picture sheet of given construction the rows of pictures will be brought into proper register with the projection means 51 by subsequent rotation of the roller 17 under the control of the ratchet wheel 36. The abutment 44 is capable of sliding movement under the control of a spring and knob 56 at the exterior of the casing so that by reciprocating the abutment 44 by means of the knob the lever 40 is operated to step round the roller 17 until the first row of pictures is in line with the projecting means 51. The pressure of the spring maintains the abutment 44 in the outer operative position after the picture sheet has been placed in position. The apparatus is then placed in automatic operation by periodically energising the solenoid 31 and it will be understood that by the initial movement of the carriage to the extreme position to the right in Figure 3, the cam 47 will have engaged the pin 45 to raise the arm 24 and permit the driving finger 34 to engage with the perforated bar 25. Therefore, by repeated energisation of the solenoid 31 the carriage is moved step-by-step to the left in Figure 3 until the pin 46 on the arm 24 engages with the cam 48 and reverses the position of the arm 24 to bring the driving finger 33 into operative position. Simultaneously, the double-armed lever 40 engages with the fixed abutment 43 to rotate the feed roller 17 through one step to bring the next row of individual pictures into line with the projection means 51. The step-by-step motion is then immediately continued in the reverse direction under the action of the driving finger 33 and the to-and-fro step-by-step motion of the carriage, together with the periodic advance of the feed roller 17 continues automatically. The individual pictures of the sequence are thus reflected upon the screen in the desired sequence.

Energising current for the solenoid may be controlled by means of any known form of intermittent electrical mechanism, for instance by means of a simple press-button or by a rotating contact arm, or arms, contacting with one or more relatively fixed contacts.

In the construction of cinematograph apparatus shown in Figures 5 to 8 of the drawings, there is employed a carrier for the picture sheet consisting of a drum 60 rotatably mounted in a carriage 61 slidable on a single bar 62 mounted on a framework within a casing 63 of the apparatus. The carriage 61 comprises end-plates 64 joined by a tubular member slidable on bar 62 and a longitudinal member 65 of V-shape cross-section, which is supported by a roller 66 rotatable about a vertical axis on a bracket 69 fixed upon the framework. In a bar 85 there is provided a plurality of pins 70 extending above and below the bar and constituting the abutments for use in the step-by-step motion of the carriage.

On a spindle 71 carried by the bracket 69 there are mounted two rotary driving members 72 and 73 formed on their opposed faces with bevel gear-teeth meshing with a gear-wheel 74 carried on a shaft 75 driven through gearing 76 by an electric motor 77. The two driving members 72 and 73 are thus rotated in opposite directions. Each of the driving members 72, 73 comprise a radial toothed part 81 to engage between pairs of successive pins 70 and a retarding flange 78 arranged to lie around three adjacent pins 70, as shown in Figures 9 and 10. By rotation of the driving member the leading edge 79 of the toothed part 81 engages behind a pin 70 to effect a movement of the carriage and at this position a part of the flange 78 indicated at 80 lies in front of a preceding pin 70 and prevents the pin 70 engaged by the tooth 81 moving away from this tooth. Also, the toothed part 81 is designed to fill the space between successive pins 70, and to prevent too rapid advance of the carriage. The inner surface of the flange 80 with which the pins 70 contact may be provided with a buffer leaf-spring to take the shock of the pin 70 as it is retarded by this flange. Thus, the carriage is advanced one step for one rotation of the driving member 72 or 73 and during the interval in which the carriage is stationary the carriage is locked in position by means of the part 82 embracing the outer ones of three consecutive pins 70.

The bar 85 carrying the pins 70 is mounted at each end of the drum upon an arm 86 pivoted at 87 upon the end member 64 of the carriage. On each of the arms 86 there is provided a sliding member 88 having cam surfaces 89 and 90 engaging with pins 91 and 92 respectively. In one position of the slide 88 on the arm 86 the engagement of the cam surfaces with the pins 91 and 92 moves the arm 86 to a lower position in which the pins 70 engage with the operating lever 73, as shown in Figure 6 and in the other position of the slide 88 on the arm 86 the latter is moved to bring the pins 70 into engagement with the operating member 72. The arm 86 is retained in each of its two alternative positions by means of a spring latch 93.

The movement of each slide 88 is effected by means of a lever 94 retained in positions corresponding to the alternative positions of the slide by means of a spring latch 95. The lower end of the lever 94 cooperates with fixed cams 96 and 97 provided for each of these levers, the cams 96 and 97 for each of the levers being located at positions corresponding to opposite ends of the travel of the carriage. By means of the cams 96 and 97 the final movement of the carriage to one end of its travel raises the pins 70 for engagement with the operating member 72 and the opposite end of the travel of the carriage lowers them for engagement with the operating member 73. Thus, by means of a continuous drive from the motor 77 the carriage is reciprocated backwards and forwards automatically.

At each end of the drum 60 there is provided a plurality of longitudinally extending pins 100 circularly arranged and spaced by a distance equivalent to the spacing of alternative rows of the pictures on the sheet. At each end of the framework there are provided two fixed wedge-shaped cams 101 with which the pins 100 engage at the end of the travel of the carriage. Each of these cams 101 is formed with an inclined face 102 which is engaged by a pin 100 so as to turn the drum to a distance corresponding to the spacing between successive rows of pictures, and the movement is limited by another surface 103 of the cam against which the next succeeding pin abuts. The pins 100 at one end of the drum 60 are interspaced relatively to those at the other end so that the drum having been positioned by the cam 101 at one end of the drum, the pin 100 at the other end of the drum is brought in line with the inclined surface of its co-operating cam 101 so that when the drum reaches the opposite end of its travel it is again advanced through a distance corresponding to successive rows of pictures.

Light from a lamp 105 is directed on to the drum and the reflected light from an area corresponding to an individual picture is directed by a lens system 106 on to a screen 107. For interrupting the light projection during actual movement of the carriage there is provided a rotating shutter 108 and a partition 109 of the casing serves to prevent stray light reaching the screen.

The picture sheet is fed into the apparatus through a slot 110 in the casing 63 over a guide 111 to the drum 60 and is guided around the drum by means of an outer guide 112. End flanges 113 on the drum serve to locate the sheet in proper position longitudinally of the drum. At the periphery of the drum there is provided a paper retaining member 114 extending lengthwise across the drum and carried by radial supports 115 connected together inside the drum and slidable radially of the drum, one at each end. Each of these supports is formed with a detent 116 engaged by a spring latch 117 adapted to hold the retaining member 114 in either of two positions, one in which it is removed from the surface of the drum as shown in Figure 8, and the other in which it is caused to bear against the surface of the drum. A paper folding member 118 pivoted on the casing 63 is arranged normally to lie against the guide 112 and is adapted to be moved therefrom to a position just beyond the retaining member 114, as shown in chain lines in Figure 8. This paper folding member 118 carries a deflecting part 119 at each side adapted to engage between pins 120 on the support 115 and so arranged that by the movement of the paper folding member 118 to the position shown in chain lines the retaining member 114 is brought to the position bearing on the drum and a movement of the folding member 118 in the opposite direction moves the retaining member 114 to its outer position.

In operation, the picture sheet is entered through the slot 110 and is guided around the drum by means of the guide 112 until the leading edge occupies a position beneath the retaining member 114, which in this instance is in the raised position. The folding member 118 is then moved by hand from the position shown in Figure 8, and carries with it the sheet so as to fold the trailing edge over the drum and beneath the retaining member 114. At the end of this movement the retaining member is moved to its alternative position as hereinbefore described so as to clamp the edges of the sheet on to the drum.

The retaining member 114 may be constructed in such width as to correspond with the width of one row of individual pictures of the sheet and to occupy in relation to the sheet on the drum a position which is uniform with the rows of pictures. The apparatus may thus be operated continuously to give repetitions of the display and if desired a shutter may be provided automatically controlled by the rotation of the drum to mask the projected light during the time in which the retaining member 114 is opposite the light projection means 106.

In that form of the apparatus shown in Figures 11 to 16, a cinematograph projection of the construction previously described is combined with means for simultaneously reproducing sound from a sound record. The complete apparatus is housed in a cabinet indicated at 120 comprising three compartments. The upper one, 121, contains the cinematograph apparatus, the second one, 122, the sound-reproducing means, and the lower one, 123, the driving mechanism for both the cinematograph apparatus and the sound-reproducing apparatus and also the wireless receiver, indicated at 124. The cinematograph apparatus is driven through a vertical shaft 125 connected by gearing 126 to the driving shaft 75 of the cinematograph apparatus. At the lower end the shaft 125 is connected by gears 127 to a spindle 128 coupled by means of a friction clutch 129 to a driving motor 130. The motor 130 also drives through a reduction gear 131 a turntable 132 for carrying a sound record of the disc type.

For controlling the sound-reproducing apparatus the drum 60 of the cinematograph apparatus carries at each end a projecting pin 133 (see Figures 11 and 16) so arranged that in the position of the drum with the retaining member 114 in line with the projector 106 it engages an inclined member 134 carried on a pivoted lever 135. The levers 135, one at each end, are coupled together for movement together and are connected to a bar 136 extending into the compartment 122 of the sound-reproducing means.

The sound-reproducing means comprises a pick-up device 137 carried on a tone-arm 138 mounted for horizontal and vertical swivel movement at 139. An extension 140 of the tone-arm has a forked end 141 in which the bar 136 engages. The extension 140 of the tone-arm is also formed with an abutment 142 which in the position of the tone-arm raised from the record, lies in the path of a striker 143 carried by an extension 144 of the sliding carriage of the cinematograph apparatus.

In the position of the drum 60 with the sheet retaining means 114 opposite the projector 106, one of the pins 133 on the drum in reaching this position rides on to the inclined member 134, depresses the lever 135 and by means of the bar 136 bearing in the forked end 141 of the tone-arm extension, lifts the pick-up 137 off a record lying on the turntable 132. Then, by the initial sliding movement of the carriage of the cinematograph apparatus, that is, while the sheet retaining member 114 is opposite the projector 106, the striker 143 engages the part 142 of the tone-arm extension and moves the pick-up to the starting position on the record. At the end of this initial traverse of the carriage of the cinematograph apparatus the drum 60 is rotated one step, as hereinbefore described, to bring the first row of pictures into line with the projector and by this rotation of the drum 60 the pin 133 which had previously engaged the cooperating inclined surface 134 now moves off this surface and the pin 133 at the other end of the drum new engages its complementary inclined surface to return the lever 135 to its other position. A spring latch 135a is provided for each of the levers 135 to retain them in either of their two alternative positions. When in this position the part 142 is now raised above the striker 143 so that subsequent sliding movements of the carriage have no effect upon the tone-arm until the pin 133 on the drum again engages with the inclined member 134 at the end of the picture sequence to again lift the tone-arm.

The turntable 132 is provided with a locating stop 150 which may be pivotally mounted in the turntable so as to be turned out of use and the record discs for use with the apparatus are provided each with a locating hole to pass over this stop 150. The stop 150 extends below the turntable 132 and is arranged to engage with an inclined member 151, forming part of a bell-crank lever 152 pivoted at 153 on a cross member of the cabinet 130. The bell-crank lever 152 is connected by a link 154 to a striker 155 for the clutch 129, this striker being pivotally mounted on a bracket 156 and adapted to be retained in positions corresponding to the engaged and disengaged positions of the clutch 129 by means of a spring latch 157. The arrangement is such that when the stop engages the inclined part 151 of the bell-crank lever, the clutch is engaged.

Thus, in operation, the picture sheet is applied to the drum 60 of the cinematograph apparatus in the manner hereinbefore described and the appropriate sound record disc is placed in position upon the turntable 132. The motor 138 is then energised and the turntable commences to rotate and at a predetermined position of the record the clutch 129 is operated to connect the cinematograph apparatus to the drive. During the first traverse of the carriage of the cinematograph apparatus the tone-arm 138 is automatically adjusted as hereinbefore described to bring the pick-up into correct starting position, and the pick-up is eventually lowered on to the record at the commencement of the picture display so as to synchronise therewith. The sound track on the record is conveniently provided with a starting groove of comparatively quick pitch to ensure proper engagement of the pick-up with the sound track.

The pick-up 137 is electrically connected with the amplifier of the wireless receiver 134 in known manner and the reproduction is obtained by means of a loudspeaker indicated at 160. A manual control 161 is provided on the front of the cabinet for operating the clutch 129, for instance when no sound reproduction is required. In addition to the manual control 161 for the clutch there is provided a control dial 162 for the wireless receiver with openings 163 at each side for sound. A hinged door 164 is provided for access to the turntable and the screen 165 of the cinematograph apparatus is arranged at the front of the cabinet provided with a hinged cover 166.

The sheet carrying the picture sequence for use with this invention may conveniently be of paper or like opaque sheet printed with the individual pictures. In this instance the light reflected from the paper sheet is projected on to the screen. Alternatively, the picture sheet may consist of transparent material having the pictures in opaque or semi-opaque material which may be coloured, in which case the surface of the drum is made highly reflective, and the light reflected by the drum through the picture sheet is in this case projected on to the screen.

By means of the cinematograph apparatus according to this invention a cinematograph display is provided from a printed or like sheet which can be produced at a very low cost, and the apparatus is especially applicable for providing news and advertisements by means of moving pictures. The apparatus is however also applicable for providing automatically a display of still pictures in succession, for instance as may be required for advertising purposes, and in this case the sliding carriage of the cinematograph apparatus is operated slowly.

I claim:

1. Apparatus for cinematograph display of a picture sequence formed in a plurality of rows on a sheet, comprising a sliding carriage for the sheet, a viewing screen, projection means for directing light reflected from the pictures on to said screen, means for moving the carriage step-by-step to bring the individual pictures in each row successively into register with the projection means, means for reversing the step-by-step movement at the end of each travel of the carriage and means for advancing the picture sheet transversely in order to bring the rows successively into register with the projection means, a sound record carrier, a pick-up device for exploring a sound record on said carrier, means connecting said pick-up device to said sliding carriage whereby said pick-up is brought to a starting position by movement of the carriage to one end of its travel and means for reproducing sound signals provided by said pick-up device.

2. Apparatus for cinematograph display of a picture sequence formed in a plurality of rows on a sheet, comprising a sliding carriage for the sheet, a viewing screen, projection means for directing light reflected from the pictures on to said screen, means for moving the carriage step-by-step to bring the individual pictures in each row successively into register with the projection means, means for reversing the step-by-step movement at the end of each travel of the carriage and means for advancing the picture sheet transversely in order to bring the rows successively into register with the projection means, a rotary sound record carrier, driving means, a driving connection between said driving means and said record carrier and a driving connection between said driving means and said sliding carriage, a clutch interposed in the latter driving connection, a pick-up device for exploring a sound record on said carrier, means connecting said pick-up device to said sliding carriage whereby said pick-up is brought to a starting position by movement of the carriage to one end of its travel, means on said sound record carrier for engaging said clutch at a predetermined position relatively to said pick-up device, and means for reproducing sound signals provided by said pick-up device.

EDWARD WALTER HOBBS.